(12) United States Patent
Nakayama et al.

(10) Patent No.: US 10,303,311 B2
(45) Date of Patent: May 28, 2019

(54) TOUCH PANEL AND METHOD FOR MANUFACTURING THE SAME

(71) Applicant: FUJIFILM Corporation, Tokyo (JP)

(72) Inventors: Masaya Nakayama, Ashigarakami-gun (JP); Hiroyuki Kobayashi, Ashigarakami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 115 days.

(21) Appl. No.: 15/285,702

(22) Filed: Oct. 5, 2016

(65) Prior Publication Data

US 2017/0024040 A1    Jan. 26, 2017

Related U.S. Application Data

(63) Continuation of application No. PCT/JP2015/057733, filed on Mar. 16, 2015.

(30) Foreign Application Priority Data

May 16, 2014    (JP) ................................. 2014-102879

(51) Int. Cl.
    G06F 3/044    (2006.01)

(52) U.S. Cl.
    CPC .... G06F 3/044 (2013.01); *G06F 2203/04103* (2013.01)

(58) Field of Classification Search
    CPC ........................ G06F 3/044; G06F 2203/04103
    See application file for complete search history.

(56) References Cited

U.S. PATENT DOCUMENTS

6,476,503 B1 * 11/2002 Imamura ............... H01L 21/561
                                                        257/737
7,135,770 B2 * 11/2006 Nishiyama ............ H01L 21/563
                                                        257/734
(Continued)

FOREIGN PATENT DOCUMENTS

JP    63-291328 A     11/1988
JP    2011-513846 A    4/2011
(Continued)

OTHER PUBLICATIONS

International Preliminary Report on Patentability, Chapter II, dated Oct. 21, 2016, issued in International Application No. PCT/JP2015/057733, 9 pages in English.

(Continued)

*Primary Examiner* — Christopher E Leiby
(74) *Attorney, Agent, or Firm* — Sughrue Mion, PLLC

(57) ABSTRACT

Provided are a touch-panel that is capable of reliably electrically connecting a terminal-portion and a flexible-printed-circuit board even in a case in which a groove formed in a resin layer is not completely filled with a conductive material in the terminal-portion and a method for manufacturing the touch-panel. A touch-panel includes a plurality of first terminal-portions that are provided so as to correspond to a plurality of first detection electrodes. The first terminal-portion includes a first resin layer that is provided on a first substrate and has a first terminal groove formed therein and a first conductive material that fills the first terminal groove. First conductive connection portions each of which comes into contact with the first conductive material of the first terminal-portion and covers at least a portion of the outer surface of the first resin layer are provided in a plurality of first terminal portions so as to be separated from each other.

22 Claims, 13 Drawing Sheets

(56) References Cited

U.S. PATENT DOCUMENTS

| | | | |
|---|---|---|---|
| 9,159,688 B2 * | 10/2015 | Myung | H01L 24/13 |
| 9,818,734 B2 * | 11/2017 | Lin | H01L 25/50 |
| 9,857,906 B2 * | 1/2018 | Park | G06F 3/0414 |
| 2009/0154132 A1 * | 6/2009 | Okamoto | H01L 23/5389 361/804 |
| 2009/0219257 A1 | 9/2009 | Frey et al. | |
| 2009/0302756 A1 | 12/2009 | Murayama et al. | |
| 2012/0051690 A1 | 3/2012 | Naito et al. | |
| 2013/0176282 A1 | 7/2013 | Nakahara | |
| 2013/0277094 A1 | 10/2013 | Lee | |
| 2013/0307565 A1 | 11/2013 | Ra et al. | |
| 2015/0109246 A1 * | 4/2015 | Lee | G06F 3/045 345/174 |

FOREIGN PATENT DOCUMENTS

| | | |
|---|---|---|
| JP | 2012-048470 A | 3/2012 |
| JP | 2013-117816 A | 6/2013 |
| JP | 2013-152599 A | 8/2013 |
| JP | 2013-225279 A | 10/2013 |
| JP | 2013-239138 A | 11/2013 |
| JP | 2014-016857 A | 1/2014 |
| JP | 2014-56565 A | 3/2014 |
| TW | 201232740 A1 | 8/2012 |
| WO | 2007/039969 A1 | 4/2007 |

OTHER PUBLICATIONS

Communication dated Jun. 13, 2017 issued by the Japanese Patent Office in counterpart application No. 2016-519144.
International Preliminary Examination Report of PCT/JP2015/057733 dated Jan. 5, 2016 [PCT/IPEA/409].
International Search Report of PCT/JP2015/057733 dated Apr. 14, 2015 [PCT/ISA/210].
Communication dated Apr. 11, 2018 from the Taiwanese Patent Office in counterpart Taiwanese application No. 104111412.
Communication dated May 16, 2018 from the Korean Intellectual Property Office in counterpart Korean application No. 10-2016-7027770.

* cited by examiner

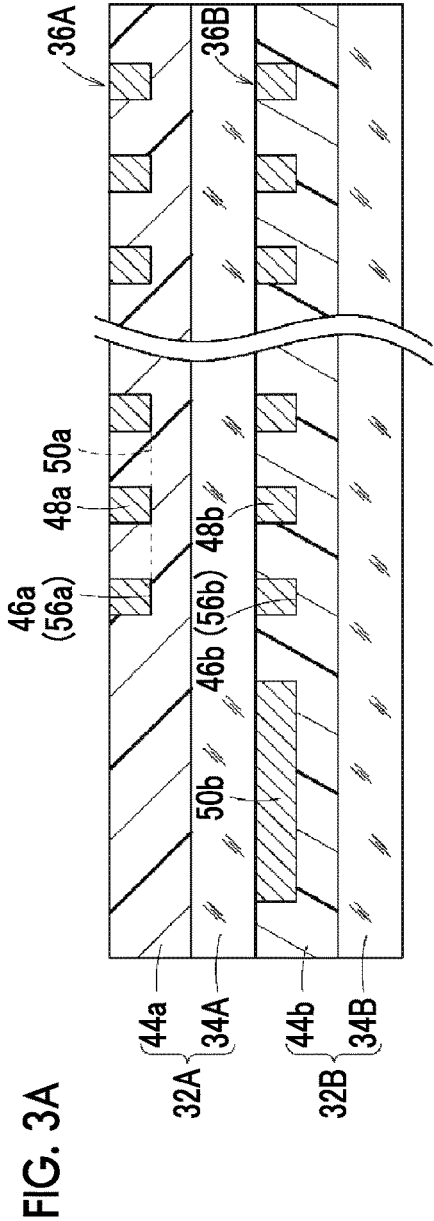
FIG. 3A
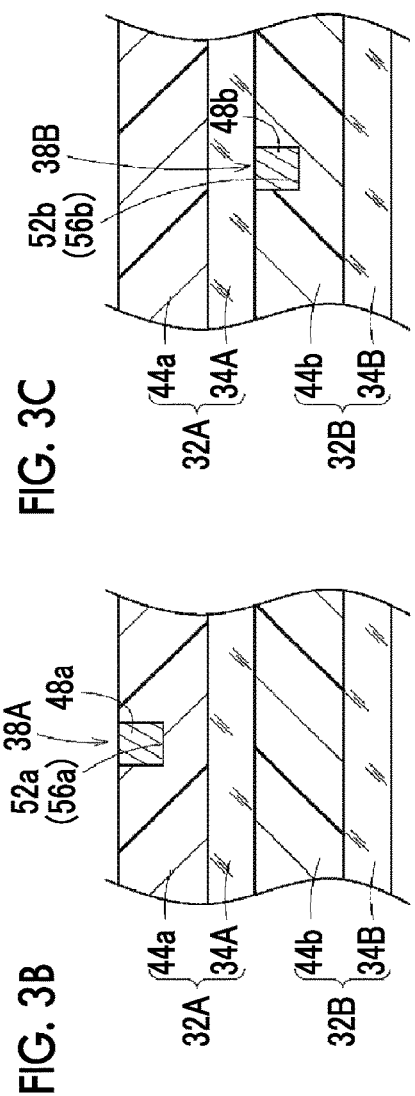
FIG. 3C
FIG. 3B

TOUCH PANEL AND METHOD FOR MANUFACTURING THE SAME

CROSS-REFERENCE TO RELATED APPLICATIONS

This application is a Continuation of PCT International Application No. PCT/JP2015/057733 filed on Mar. 16, 2015, which claims priority under 35 U.S.C § 119 (a) to Japanese Patent Application No. 2014-102879 filed on May 16, 2014. Each of the above application(s) is hereby expressly incorporated by reference, in its entirety, into the present application.

BACKGROUND OF THE INVENTION

1. Field of the Invention

The present invention relates to a touch panel comprising terminal portions that are provided so as to correspond to a plurality of detection electrodes and a method for manufacturing the same.

2. Description of the Related Art

A so-called touch panel that enables a user to perform various operations using a finger is widely used as a display device of, for example, a multi-function mobile phone (smart phone) or a digital camera. In the touch panel, a technical idea is known in which a concave groove formed in a substrate is filled with a conductive material to form a detection electrode (for example, see FIGS. 5 and 6 and paragraphs <0076> to <0078> in JP2011-513846A).

SUMMARY OF THE INVENTION

A touch panel is considered in which a concave groove is formed in a resin layer provided on a substrate and is filled with a conductive material to form a terminal portion, similarly to the detection electrode according to the related art disclosed in JP2011-513846A. The terminal portion indicates an electrode terminal portion for electrical connection to a flexible printed circuit (FPC) board.

However, in a case in which the terminal portion is formed in this way, the groove is not completely filled with the conductive material and a space is likely to be formed on an opening side of the groove. In this case, when the terminal portion is bonded to the flexible printed circuit board through an anisotropic conductive film, the anisotropic conductive film does not enter the space formed on the opening side of the groove, which makes it difficult to reliably bring the anisotropic conductive film into contact with the conductive material. As a result, it is difficult to electrically connect the terminal portion and the flexible printed circuit board.

The invention has been made in view of the above-mentioned problems and an object of the invention is to provide a touch panel that is capable of reliably electrically connecting a conductive material of a terminal portion and a flexible printed circuit board even in a case in which a groove formed in a resin layer is not completely filled with the conductive material in the terminal portion and a method for manufacturing the touch panel.

A touch panel according to the invention comprises a substrate, a plurality of detection electrodes that are provided on the substrate, terminal portions that are provided so as to correspond to the detection electrodes, and peripheral wires that electrically connect the detection electrodes and the terminal portions corresponding to the detection electrodes. The terminal portion includes a resin layer that is provided on the substrate and has a groove and a conductive material that fills the groove. A plurality of terminal portions have conductive connection portions that are separated from each other. The conductive connection portion comes into contact with the conductive material of the terminal portion and covers a portion of an outer surface of the resin layer.

According to the touch panel of the invention, it is possible to reliably electrically connect the conductive material and an anisotropic conductive film through the conductive connection portion. Therefore, even in a case in which the groove formed in the resin layer is not completely filled with the conductive material, it is possible to reliably electrically connect the conductive material of the terminal portion and a flexible printed circuit board through the connection portion and the anisotropic conductive film.

However, as the width of the groove of the terminal portion increases, a space (a space which is not filled with the conductive material) on the opening side of the groove increases. Therefore, in the connection portion, the surface of a portion which covers the conductive material is likely to be closer to the bottom of the groove than a portion that covers the outer surface of the resin layer. When a recessed portion is formed in a part of the surface of the connection portion, the contact resistance between the connection portion and the anisotropic conductive film is likely to increase. In contrast, as the width of the groove of the terminal portion decreases, a contact area decreases. Therefore, the contact resistance between the conductive material filling the groove and the connection portion decreases.

For this reason, preferably, the terminal portion includes a plurality of grooves and the connection portion extends across at least two or more grooves. According to this structure, the contact area increases and it is possible to reduce both the contact resistance between the conductive material forming the terminal portion and the connection portion and the contact resistance between the connection portion and the anisotropic conductive film.

Preferably, in the terminal portion, the plurality of grooves are arranged in a mesh shape. According to this structure, it is possible to effectively increase the number of grooves forming the terminal portion. Therefore, it is possible to further reduce the contact resistance between the conductive material of the terminal portion and the connection portion.

The detection electrode and the peripheral wire each may include the resin layer having the groove and the conductive material filling the groove. According to this structure, it is possible to form the detection electrode, the peripheral wires, and the terminal portion at the same time in the same step and thus to reduce the number of steps.

Preferably, an average value of a height of the connection portion from the outer surface of the resin layer is in a range of 0.1 μm to 2.0 μm. According to this structure, it is possible to appropriately reduce the contact resistance between the connection portion and the anisotropic conductive film and to reliably bond the anisotropic conductive film to a portion of the outer surface of the resin layer which is not covered with the connection portion.

Preferably, the connection portion includes conductive oxide particles and a binder. According to this structure, it is possible to easily repair the anisotropic conductive film with respect to the connection portion. Here, the term "repair" means a process of detaching the anisotropic conductive film bonded to the connection portion and bonding the anisotropic conductive film to the connection portion again.

Preferably, the connection portion is electrically connected to a flexible printed circuit board through an anisotropic conductive film. According to this structure, it is possible to reliably electrically connect the flexible printed circuit board and the terminal portion.

According to the invention, there is provided a method for manufacturing a touch panel comprising a substrate, a plurality of detection electrodes that are provided on the substrate, terminal portions that are provided so as to correspond to the detection electrodes, peripheral wires that electrically connect the detection electrodes and the terminal portions corresponding to the detection electrodes, and connection portions that are provided in a plurality of terminal portions so as to be separated from each other. The method includes an electrode portion forming step of forming the detection electrode and the peripheral wire, a terminal portion forming step of forming the terminal portion, and a connection portion forming step of forming the connection portion. The terminal portion forming step includes a groove forming step of forming a resin layer on at least a portion of one surface of the substrate and pressing a mold having a projection against the resin layer to form a groove, a filling step of filling at least a portion of the groove with an ink-like conductive material, and a removal step of removing the ink-like conductive material remaining on the outer surface of the resin layer. In the connection portion forming step, a conductive member is patterned as the connection portion so as to come into contact with the conductive material of the terminal portion and to cover a portion of the outer surface of the resin layer.

According to the method for manufacturing a touch panel of the invention, the same effect as that of the touch panel according to the invention is obtained.

Preferably, in the connection portion forming step, an ink-like conductive member is patterned as the connection portion by screen printing or ink jetting. According to this method, it is possible to easily and effectively obtain the connection portion using screen printing or ink jetting.

Preferably, in the groove forming step, the mold is pressed against the resin layer to form a plurality of grooves in the terminal portion. Preferably, in the connection portion forming step, the connection portion is formed so as to extend across at least two or more grooves. According to this method, it is possible to reduce both the contact resistance between the conductive material of the terminal portion and the connection portion and the contact resistance between the connection portion and an anisotropic conductive film.

Preferably, in the groove forming step, the mold is pressed against the resin layer to form a plurality of grooves in the terminal portion in a mesh shape. According to this method, it is possible to easily form mesh-shaped grooves in the resin layer of the terminal portion and to further reduce the contact resistance between the conductive material of the terminal portion and the connection portion.

Preferably, the electrode portion forming step and the terminal portion forming step are the same step and are performed at the same time. According to this method, it is possible to effectively form the detection electrode, the peripheral wire, and the terminal portion.

Preferably, the method for manufacturing a touch panel further includes a pressing step of pressing a flexible printed circuit board and the connection portion, using an anisotropic conductive film, so as to be electrically connected to each other after the connection portion forming step. According to this method, it is possible to reliably electrically connect the flexible printed circuit board and the terminal portion.

According to the invention, in the touch panel comprising the terminal portion formed by filling the groove formed in the resin layer with the conductive material, it is possible to reliably electrically connect the terminal portion and the flexible printed circuit board. In particular, even in a case in which the groove formed in the resin layer is not completely filled with the conductive material in the terminal portion, it is possible to reliably connect the conductive material of the terminal portion and the flexible printed circuit board through the connection portion and the anisotropic conductive film.

BRIEF DESCRIPTION OF THE DRAWINGS

FIG. 3A is a cross-sectional view taken along the line IIIA-IIIA of FIG. 2, FIG. 3B is a cross-sectional view taken along the line IIIB-IIIB of FIG. 2, and FIG. 3C is a cross-sectional view taken along the line IIIC-IIIC of FIG. 2.

DESCRIPTION OF THE PREFERRED EMBODIMENTS

Hereinafter, preferred embodiments of a touch panel and a method for manufacturing the touch panel according to the invention will be described with reference to the accompanying drawings. In the specification, the numerical range represented by "to" means a range which includes values before and after "to" as a lower limit and an upper limit, respectively.

Figure 1:
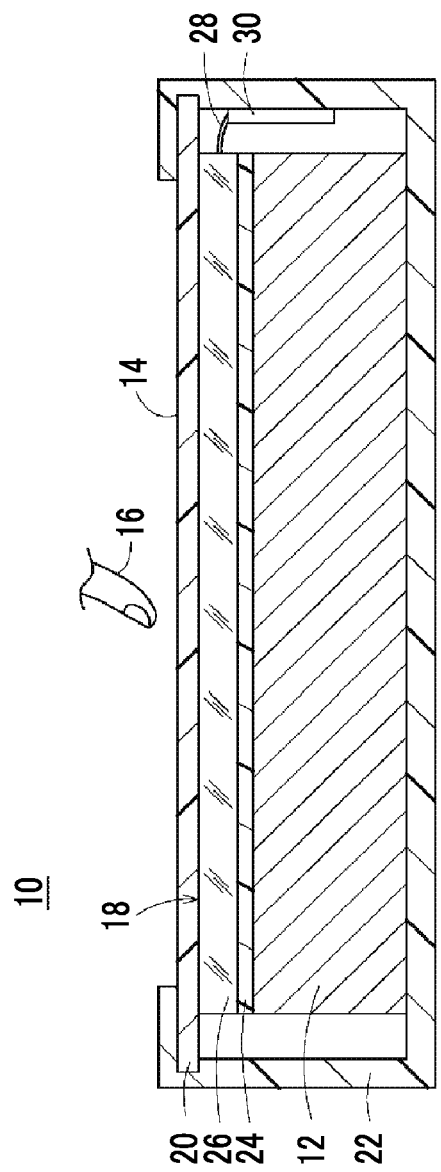
FIG. 1 is a cross-sectional view illustrating a touch panel according to an embodiment of the invention.
Figure 2:
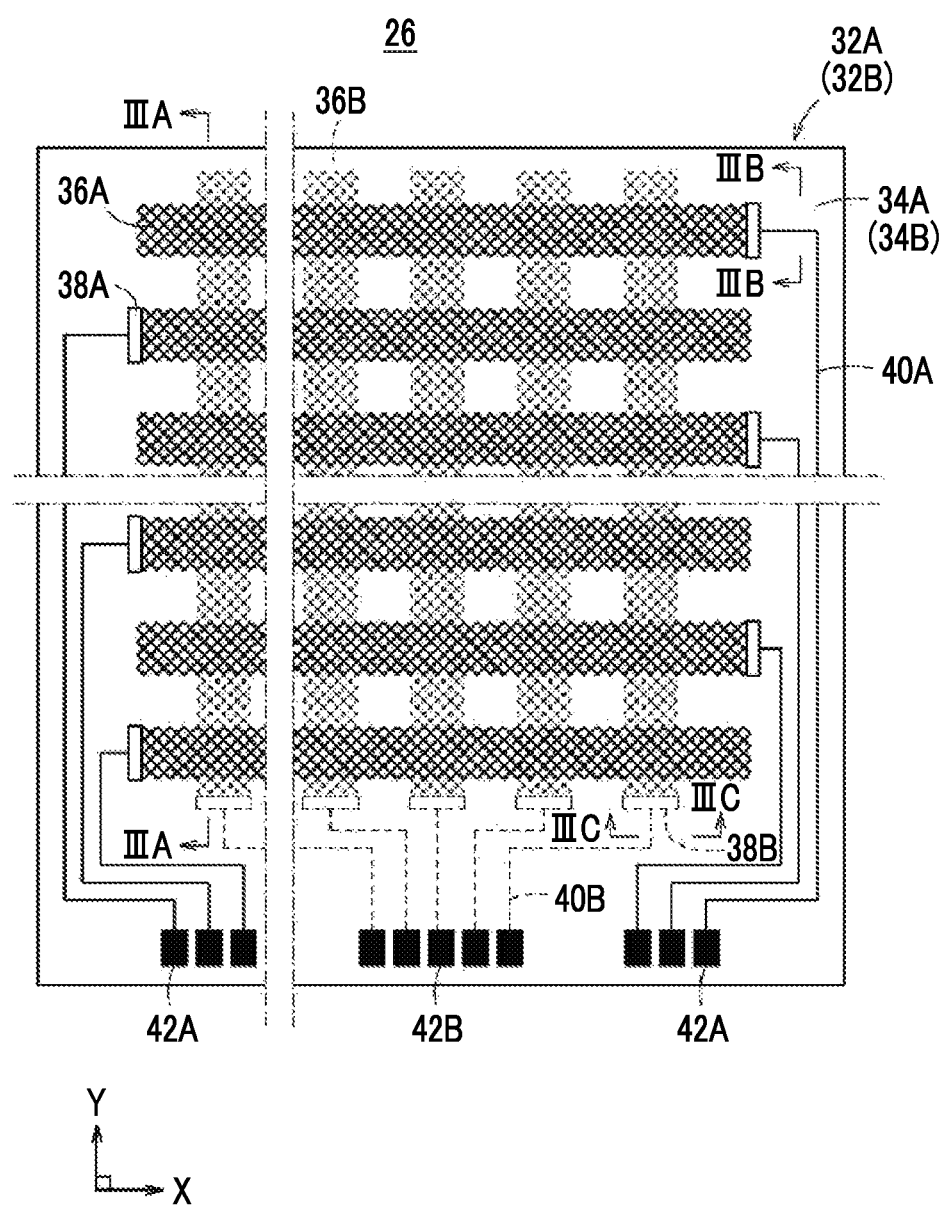
FIG. 2 is a plan view illustrating a sensor body forming the touch panel illustrated in FIG. 1.

As illustrated in FIG. 1, a touch panel 10 is a capacitive touch panel and comprises a display device 12 that displays arbitrary visible information, a touch sensor 18 that detects the position of an indicator 16, such as a finger which touches or approaches a touch surface 14 of the touch panel 10, a cover member 20 that covers the touch sensor 18, and a housing 22.

The display device 12 is not particularly limited and various types of display devices may be used. Preferred examples of the display device 12 include a liquid crystal display, a plasma display, an organic electro-luminescence (EL) display, an inorganic EL display, and an electronic paper.

The touch sensor 18 includes a sensor body 26 that is bonded to one surface of the display device 12 through an adhesive layer 24 and a control circuit unit (for example, an IC circuit) 30 that is electrically connected to the sensor body 26 through a flexible printed circuit board 28. The detailed structure of the sensor body 26 will be described below.

When the indicator 16 touches or approaches the touch surface 14, the control circuit unit 30 checks a change in capacitance between the indicator 16 and the sensor body 26 and detects a contact position or an approach position. In the example illustrated in FIG. 1, the control circuit unit 30 is fixed to the inner surface of the housing 22. However, the control circuit unit 30 may be fixed to an arbitrary position of the housing 22.

The cover member 20 is stacked on one surface of the sensor body 26 to form the touch surface 14 of the touch panel 10. The cover member 20 may be coated with, for example, a silicon oxide and may be bonded to one surface of the sensor body 26. Alternatively, the cover member 20 may be bonded to one surface of the sensor body 26 through a transparent gluing agent, such as an optical clear adhesive (OCA), in order to prevent damage due to friction. The material forming the cover member 20 may be preferably, for example, glass, tempered glass, sapphire, or a resin such as polycarbonate (PC) or polymethyl methacrylate (PMMA). The housing 22 accommodates the display device 12, the touch sensor 18, and the cover member 20.

As illustrated in FIGS. 2 to 4B, the sensor body 26 is formed by stacking a first conductive film 32A and a second conductive film 32B. The first conductive film 32A and the second conductive film 32B are stacked through a transparent gluing agent, such as an OCA sheet, which is not illustrated. The first conductive film 32A includes a first substrate 34A, a plurality of first detection electrodes 36A that are provided on the first substrate 34A, a plurality of first peripheral wires 40A that are electrically connected to the first detection electrodes 36A through first wire connection portions 38A, and a plurality of first terminal portions 42A that are electrically connected to the first peripheral wires 40A.

The first substrate 34A is an insulating and transparent substrate 34. The transmittance of visible light with a wavelength of 400 nm to 700 nm through the first substrate 34A can be arbitrarily set. However, the transmittance is preferably equal to or greater than 80% and more preferably equal to greater than 90%. It is preferable that the first substrate 34A has a thickness of 25 µm to 250 µm.

For example, glass or a resin can be preferably used as the material forming the first substrate 34A. Examples of this type of resin include: polyesters, such as polyethylene terephthalate (PET) and polyethylene naphthalate (PEN); polyolefins, such as polyethylene (PE), polypropylene (PP), polystyrene, and polyethylene vinyl acetate (EVA); vinyl-based resins; acrylic resins, such as polycarbonate (PC), polyamide, polyimide, and polymethyl methacrylate (PMMA); triacetyl cellulose (TAC); cyclo-olefin polymer (COP); cyclo-olefin copolymer (COC); and polyether sulfone (PES).

The plurality of first detection electrodes 36A are provided in parallel so as to be separated from each other in a second direction (the Y direction and the longitudinal direction of the first substrate 34A) while extending in the first direction (the X direction and the lateral direction of the first substrate 34A). The first detection electrode 36A includes a first resin layer 44a that is provided on the first substrate 34A and has a first concave electrode groove 46a and a first conductive material 48a that fills the first concave electrode groove 46a (see FIG. 3A).

In this embodiment, the first resin layer 44a is stacked on the entire one surface of the first substrate 34A. However, the first resin layer 44a may be stacked on a portion of the first substrate 34A. The first resin layer 44a is an insulating and transparent layer and can be appropriately made of, for example, an ultraviolet-curable resin or a thermosetting resin. Examples of the material forming the first resin layer 44a include an acrylic resin, a urethane resin, an epoxy resin, and a polyester resin. In particular, the material is preferably an acrylic resin or a urethane resin.

The first detection electrode 36A has a mesh pattern obtained by arranging a plurality of first electrode grooves 46a in a mesh shape in a plan view. In other words, the mesh pattern is a combination of a plurality of cells having the same square shape. The width of the first electrode groove 46a is preferably in the range of 1 µm to 10 µm and the pitch between the first electrode grooves 46a which are parallel and adjacent to each other is preferably in the range of 50 µm to 600 µm. The shape of a cell of the mesh may be a polygon, such as a triangle, a rectangle, a pentagon, or a hexagon. Among them, it is preferable that the shape of the cell is a rhomboid, a square, and a regular hexagon. The mesh pattern may be a combination of a plurality of cells with different shapes or may be a random pattern.

The first electrode groove 46a has a square shape in a cross-sectional view. The depth of the first electrode groove 46a is preferably in the range of 1 µm to 10 µm and more preferably in the range of 1 µm to 5 µm. In this case, it is possible to relatively reduce the thickness of the first resin layer 44a and to effectively prevent the cutting of the first conductive material 48a filling the first terminal groove 54a. This is also applied to the depth of a first wire connection groove 50a, a first wiring groove 52a, and a first terminal groove 54a which will be described below. The first electrode groove 46a can be set in an arbitrary shape in a cross-sectional view.

The first conductive material 48a includes at least one type of material selected from a group consisting of copper, silver, aluminum, nickel, chromium, and carbon black. In addition, the first conductive material 48a may be formed by stacking a plurality of types of materials.

The first wire connection portions 38A are alternately provided at one end of the first detection electrode 36A and each include the first resin layer 44a having the first concave wire connection groove 50a and the first conductive material 48a that fills the first concave wire connection groove 50a. The first wire connection groove 50a is connected to the first electrode groove 46a, has a rectangular shape in a plan view, and extends in the X direction.

The first peripheral wires 40A electrically connect a plurality of first detection electrodes 36A and the corresponding first terminal portions 42A and each include the first resin layer 44a having the first concave wiring groove 52a and the first conductive material 48a that fills the first concave wiring groove 52*a* (see FIG. 3B). The first wiring groove 52*a* is connected to the first wire connection groove 50*a*. The width of the first wiring groove 52*a* is preferably greater than the width of the first electrode groove 46*a* and may be equal to the width of the first electrode groove 46*a*.

A plurality of first terminal portions 42A are provided at one end of the first substrate 34A in the Y direction in a state in which they are separated from each other in the X direction (in a state in which they are electrically insulated from each other). The gap between the first terminal portions 42A which are adjacent to each other in the X direction is preferably in the range of 50 µm to 500 µm and more preferably in the range of 100 µm to 300 µm, in terms of electrical insulation and a reduction in size.

Figure 4A:
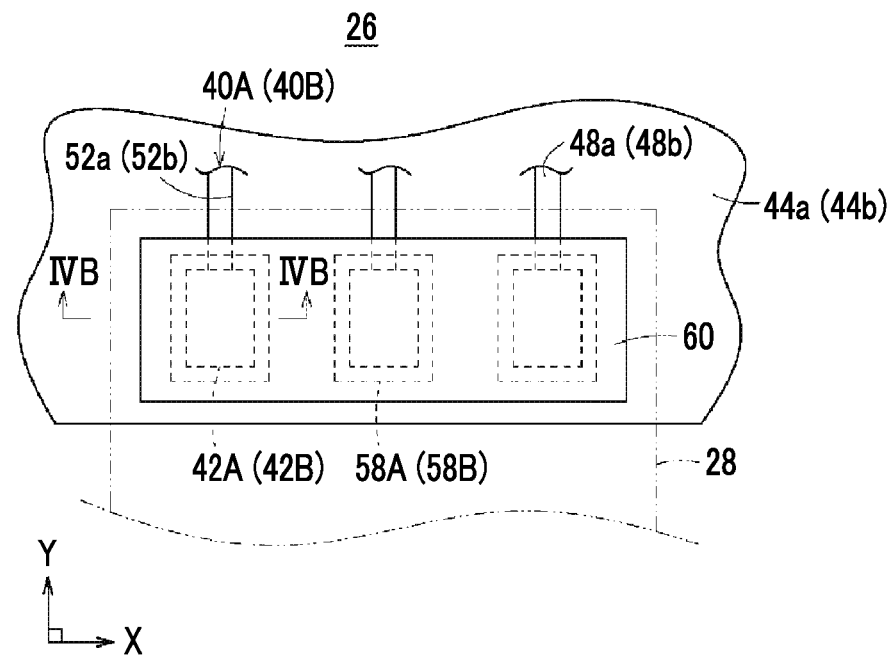
FIG. 4A is a partial plan view illustrating connection between a terminal portion and a flexible printed circuit board and FIG. 4B is a partial cross-sectional view taken along the line IVB-IVB of FIG. 4A.
Figure 4B:
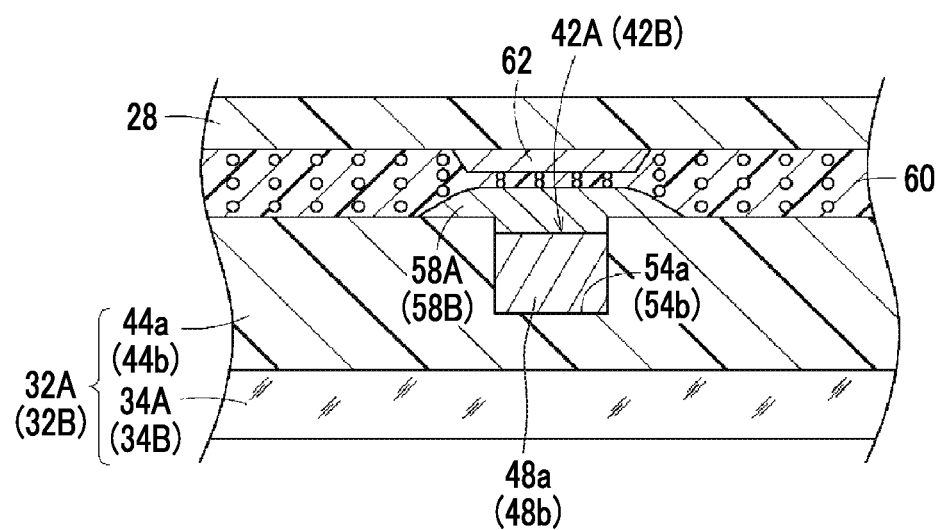

The first terminal portion 42A includes the first resin layer 44*a* having the first concave terminal groove 54*a* and the first conductive material 48*a* that fills the first concave terminal groove 54*a* (see FIG. 4B). The first terminal groove 54*a* is connected to the first wiring groove 52*a*. The first terminal portion 42A has a solid pattern obtained by forming the first terminal groove 54*a* in a rectangular shape in a plan view and extends in the Y direction.

The width (dimensions in the X direction) of the first terminal groove 54*a* is greater than the width of the first wiring groove 52*a*. Specifically, the width of the first terminal groove 54*a* is preferably in the range of 50 µm to 500 µm and more preferably in the range of 200 µm to 400 µm, in terms of contact resistance with a first connection portion 58A, which will be described below, and a reduction in size.

The first terminal groove 54*a* is not completely filled with the first conductive material 48*a*. That is, the surface of the first conductive material 48*a* filling the first terminal groove 54*a* is closer to the bottom of the groove than the outer surface of the first resin layer 44*a*.

In the first conductive film 32A, the first electrode grooves 46*a*, the first wire connection grooves 50*a*, the first wiring grooves 52*a*, and the first terminal grooves 54*a* which correspond to each other are connected to form a plurality of series of first concave grooves 56*a* and the first grooves 56*a* are filled with the first conductive material 48*a* to form the plurality of first detection electrodes 36A, the plurality of first wire connection portions 38A, the plurality of first wiring portions, and the plurality of first terminal portions 42A.

As illustrated in FIGS. 4A and 4B, the touch panel 10 according to this embodiment includes a plurality of first connection portion 58A with conductivity that are provided in the plurality of first terminal portions 42A so as to be separated from each other. The first connection portion 58A comes into contact with the first conductive material 48*a* filling the first terminal groove 54*a* and covers a portion of the first resin layer 44*a*.

The plurality of first connection portions 58A are electrically connected to predetermined terminals 62 of the flexible printed circuit board 28 through an anisotropic conductive film (ACF) 60. The anisotropic conductive film 60 is formed by dispersing conductive particles in an insulating thermosetting resin, has conductivity in a thickness direction, and has an insulating property in a plane direction. It is preferable that the anisotropic conductive film 60 is provided so as to cover two or more first connection portions 58A. It is more preferable that the anisotropic conductive film 60 is provided so as to cover all of the first connection portions 58A.

The first connection portion 58A is formed in a rectangular shape that is slightly larger than the first terminal groove 54*a* in a plan view. The width of the first connection portion 58A is preferably 2 µm to 100 µm greater than the width of the first terminal groove 54*a* and is more preferably 10 µm to 50 µm greater than the width of the first terminal groove 54*a*. In this case, it is possible to effectively cover the entire surface of the first terminal groove 54*a* with the first connection portion 58A while ensuring the electrical insulation between the first connection portions 58A which are adjacent to each other.

The average value of the height of the first connection portion 58A from the outer surface of the first resin layer 44*a* is preferably in the range of 0.05 µm to 5.0 µm and more preferably in the range of 0.1 µm to 2.0 µm. In this case, it is possible to appropriately reduce the contact resistance between the first connection portion 58A and the anisotropic conductive film 60 and to bond the anisotropic conductive film 60 to a portion of the outer surface of the first resin layer 44*a* which is not covered with the first connection portion 58A.

Figure 13:
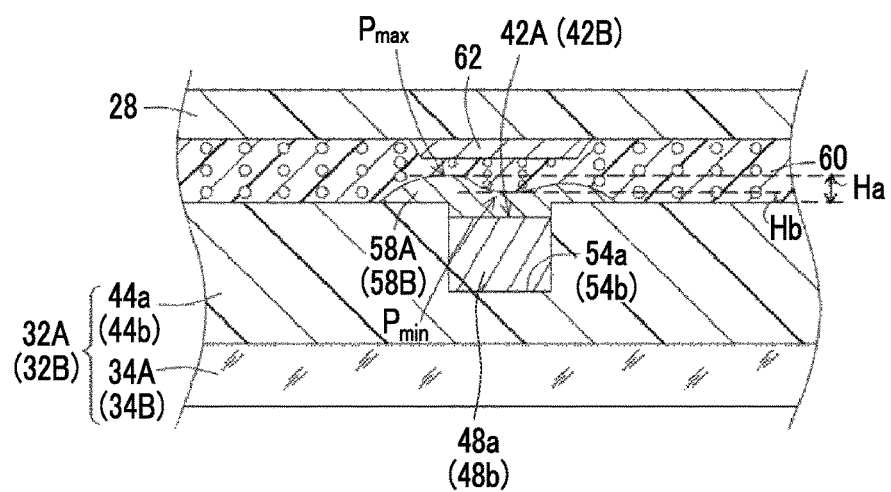
FIG. 13 is a cross-sectional view illustrating the calculation of the average value of the height from the outer surface of a resin layer.

As illustrated in FIG. 13, the average value (Have) of the height of the first connection portion 58A from the outer surface of the first resin layer 44*a* can be defined as an intermediate height between the height Ha of the highest part $P_{max}$ of the first connection portion 58A from the outer surface of the first resin layer 44*a* and the height Hb of the lowest part $P_{min}$ of the first connection portion 58A on the first terminal portion 42A from the outer surface of the first resin layer 44*a*. That is, the average value is defined as follows: Have=(Ha+Hb)/2.

It is preferable that a conductive member forming the first connection portion 58A includes at least one type of conductive material which is selected from a group consisting of a conductive oxide, such as an indium tin oxide (ITO), metal, such as copper, silver, aluminum, nickel, chromium, or gold, conductive fiber, such as carbon nanotube or metal nanowire, and a polymer conductive material, such as polyacetylene or polythiophene.

It is preferable that the first connection portion 58A is a conductive member including conductive particles and a binder. The conductive member including conductive particles and a binder can be a liquid, such as ink or paste, is likely to be permeated into the first concave terminal groove 54*a* of the first terminal portion 42A, and has an effect of reducing contact resistance with the conductive material filling the first concave terminal groove 54*a* with a small width. Metal particles, such as silver particles, or conductive oxide particles can be used as the conductive particles. In particular, conductive oxide particles are preferable. ITO is given as an example of a material forming the conductive oxide particles. In this case, it is easy to repair the anisotropic conductive film 60 with respect to the first connection portion 58A, which is preferable. That is, after the anisotropic conductive film 60 is bonded to the first connection portion 58A, it can be detached from the first connection portion 58A and then bonded to the first connection portion 58A again.

The average diameter of the conductive particles is preferably in the range of 1 nm to 500 nm, more preferably in the range of 5 nm to 100 nm, and most preferably in the range of 10 nm to 80 nm.

The binder has a function of binding conductive particles to increase the conductivity and strength of a conductive member. An organic and/or inorganic binder can be used as the binder. The organic binder (resin binder) can be appropriately selected from a group consisting of, for example, a thermoplastic resin, a thermosetting resin, a room-temperature-curable resin, an ultraviolet-curable resin, and an electron-beam-curable resin. For example, the thermoplastic resin has various glass transition points (Tg) according to the type and structure thereof. Therefore, it is preferable that a thermoplastic resin is appropriately selected according to the heat resistance of a base. A thermoplastic resin that is generally known can be used as the thermoplastic resin. However, it is preferable to use a thermoplastic resin with a high glass transition point (Tg).

In addition, examples of the thermoplastic resin include an acrylic resin, such as a methacryl resin, and a polyester resin. For example, an epoxy resin or a fluorine resin can be used as the thermosetting resin. For example, a two-pack epoxy resin or various types of urethane resins can be used as the room-temperature-curable resin. For example, a resin including various types of oligomers, monomers, and photoinitiators can be used as the ultraviolet-curable resin. For example, a resin including various types of oligomers and monomers can be used as the electron-beam-curable resin. However, the resins are not limited to the above. A binder having, for example, silica sol, alumina sol, zirconia sol, and titania sol as main components can be given as an example of the inorganic binder. For example, the following polymer can be used as the silica sol: a polymer obtained by adding water or an acid catalyst to tetraalkyl silicate and performing hydrolysis and dehydration condensation; or a polymer obtained by performing hydrolysis and dehydration condensation for a commercially available alkyl silicate solution which is obtained by the polymerization of tetraalkyl silicate to a tetramer or a pentamer. When the degree of dehydration condensation is too high, the viscosity of a solution increases and the solution is finally solidified. Therefore, the degree of dehydration condensation is adjusted to be equal to or less than the upper limit of the viscosity of a solution that can be applied. However, the degree of dehydration condensation is not particularly limited as long as it is equal to or less than the upper limit of viscosity. It is preferable that a weight-average molecular weight is about 500 to 50000, considering, for example, the strength and weather resistance of a film. Then, a dehydration condensation reaction (cross-linking reaction) to the polymer (silica sol) obtained by hydrolyzing alkyl silicate is substantially completed when an application liquid for forming a transparent conductive film is applied, dried and heated and the polymer becomes a hard silicate binder matrix (a binder matrix having a silicon oxide as a main component). An organic-inorganic hybrid binder can also be used as the binder. Examples of the binder include a binder obtained by modifying the silica sol with some organic functional groups and a binder having various types of coupling agents, such as a silicon coupling agent, as main components.

The second conductive film 32B includes a second substrate 34B, a plurality of second detection electrodes 36B that are provided on the second substrate 34B, a plurality of second peripheral wires 40B that are electrically connected to the second detection electrodes 36B through second wire connection portions 38B, and a plurality of second terminal portions 42B that are electrically connected to the second peripheral wires 40B.

The second substrate 34B has the same structure as the first substrate 34A. The plurality of second detection electrodes 36B are provided in parallel so as to be separated from each other in X direction while extending in the Y direction. The second detection electrode 36B includes a second resin layer 44b that is provided on the second substrate 34B and has a second concave electrode groove 46b and a second conductive material 48b that fills the second concave electrode groove 46b (see FIG. 3A).

The same material as the first conductive material 48a can be appropriately used as the second conductive material 48b. The second wire connection portion 38B is provided at one end of the second detection electrode 36B and includes the second resin layer 44b having the second concave wire connection groove 50b and the second conductive material 48b that fills the second concave wire connection groove 50b.

The second peripheral wires 40B have the same structure as the first peripheral wires 40A, electrically connect a plurality of second detection electrodes 36B and the corresponding second terminal portions 42B, and each include the second resin layer 44b having a second concave wiring groove 52b and the second conductive material 48b that fills the second concave wiring groove 52b.

A plurality of second terminal portions 42B are provided at one end of the second substrate 34B in the Y direction in a state in which they are separated from each other in the X direction (in a state in which they are electrically insulated from each other). The gap between the second terminal portions 42B which are adjacent to each other in the X direction is preferably in the range of 50 μm to 500 μm and more preferably in the range of 100 μm to 300 μm, in terms of electrical insulation and a reduction in size.

The second terminal portion 42B has the same structure as the first terminal portion 42A and includes the second resin layer 44b having a second concave terminal groove 54b and the second conductive material 48b that fills the second concave terminal groove 54b.

In the second conductive film 32B, the second electrode grooves 46b, the second wire connection grooves 50b, the second wiring grooves 52b, and the second terminal grooves 54b which correspond to each other are connected to form a plurality of series of second concave grooves 56b and the second grooves 56b are filled with the second conductive material 48b to form the plurality of second detection electrodes 36B, the plurality of second wire connection portions 38B, the plurality of second wiring portions, and the plurality of second terminal portions 42B.

The touch panel 10 according to this embodiment includes a plurality of second connection portions 58B that are provided in the plurality of second terminal portions 42B so as to be separated from each other. The second connection portion 58B comes into contact with the second conductive material 48b filling the second terminal groove 54b and covers a portion of the second resin layer 44b. The plurality of second connection portions 58B are electrically connected to the predetermined terminals 62 of the flexible printed circuit board 28 through the anisotropic conductive film 60. The second connection portion 58B has the same structure as the first connection portion 58A and the detailed description thereof will not be repeated.

The touch panel 10 according to this embodiment basically has the above-mentioned structure. Next, a method for manufacturing the touch panel 10 will be described. Hereinafter, a method for manufacturing the first conductive film 32A and the first connection portion 58A will be mainly described. Since a method for manufacturing the second conductive film 32B and the second connection portion 58B is basically the same as the method for manufacturing the first conductive film 32A and the first connection portion 58A, the description thereof will not be repeated.

Figure 5:
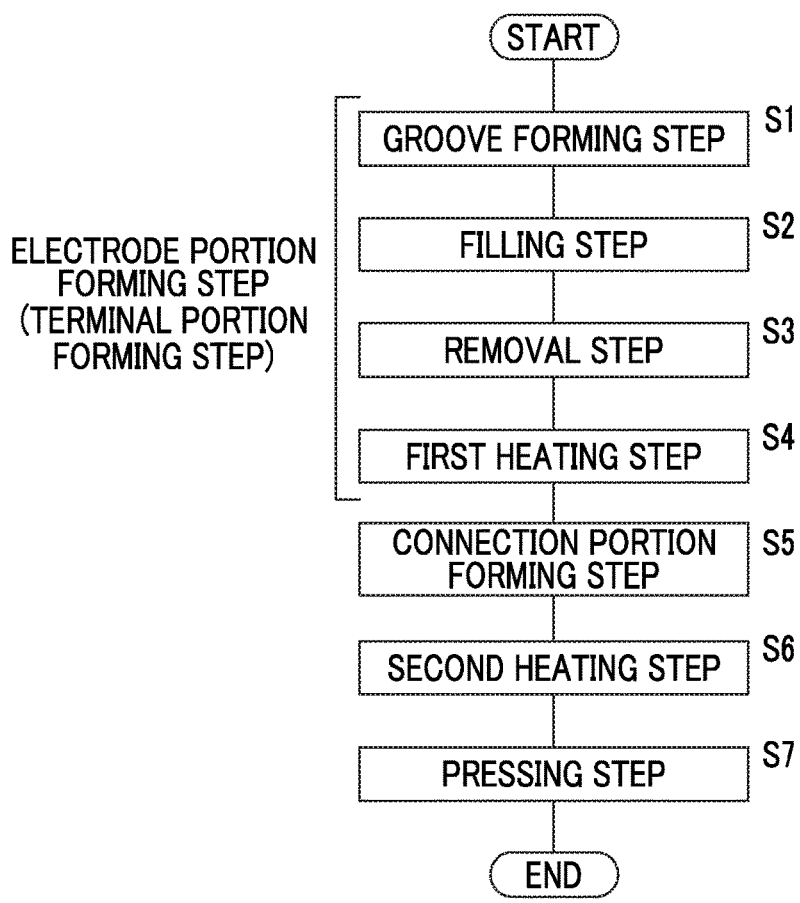
FIG. 5 is a flowchart illustrating touch panel manufacturing method according to an embodiment of the invention.
Figure 6A:
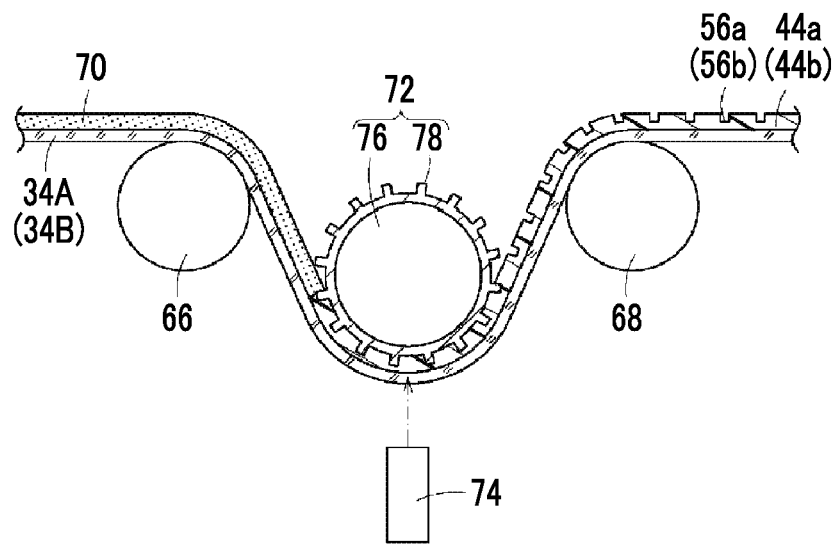
FIG. 6A is a cross-sectional view illustrating a groove forming step.

First, an ultraviolet-curable resin 70 is applied onto one surface of the first substrate 34A that is transported by a plurality of rollers 66 and 68. Then, as illustrated in FIG. 6A, an imprint mold 72 having convex projections is pressed against (transferred to) the ultraviolet-curable resin 70 applied onto one surface of the first substrate 34A and an ultraviolet irradiation device 74 irradiates the ultraviolet-curable resin 70 with ultraviolet rays to obtain the first resin layer 44a having predetermined concave grooves formed therein (Step S1 in FIG. 5: a groove forming step). Preferred examples of the ultraviolet-curable resin 70 include an ultraviolet-curable acrylic resin and an ultraviolet-curable urethane resin.

Figure 6B:
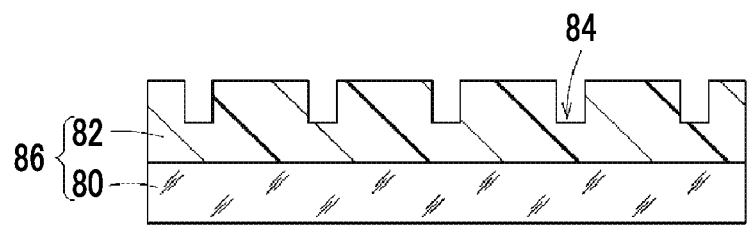
FIG. 6B is a cross-sectional view illustrating a master mold of a film mold used in the groove forming step.
Figure 6C:
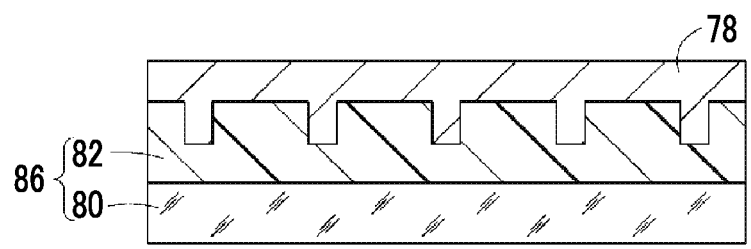
FIG. 6C is a cross-sectional view illustrating a state in which the film mold is manufactured by the master mold.

Here, the imprint mold 72 includes a roller portion 76 and a film mold 78 that is bonded to an outer circumferential surface of the roller portion 76 through an adhesive layer. The film mold 78 is formed as follows. That is, first, a photosensitive material 82 applied onto a glass substrate 80 is exposed to light and a predetermined concave groove pattern 84 is formed on the photosensitive material 82 to obtain a master mold 86 (see FIG. 6B). As the photosensitive material 82, a material with a sufficiently small surface roughness is selected. Then, the film mold 78 having a convex pattern corresponding to the groove pattern is obtained by the electrolytic deposition of nickel on the groove pattern of the master mold 86 (see FIG. 6C).

It is preferable that a surface treatment is performed on the film mold 78 in order to smoothly separate the film mold 78 from the first resin layer 44a. A method for coating a film with a silicon dioxide using a sputtering method (coated with a thickness of 1200 Å to 1500 Å) is given as an example of the surface treatment.

In the groove forming step, the first concave grooves 56a (a plurality of first electrode grooves 46a, a plurality of first wire connection grooves 50a, a plurality of first wiring grooves 52a, and a plurality of first terminal grooves 54a) are simultaneously formed in the first resin layer 44a by one imprint mold 72. However, the first concave grooves 56a may be formed by a plurality of imprint molds 72.

In the groove forming step, the first resin layer 44a having the first concave grooves 56a formed therein may be obtained as follows: a thermosetting resin is applied onto one surface of the first substrate 34A; the imprint mold 72 is pressed against the thermosetting resin; and the thermosetting resin is heated.

Figure 7A:
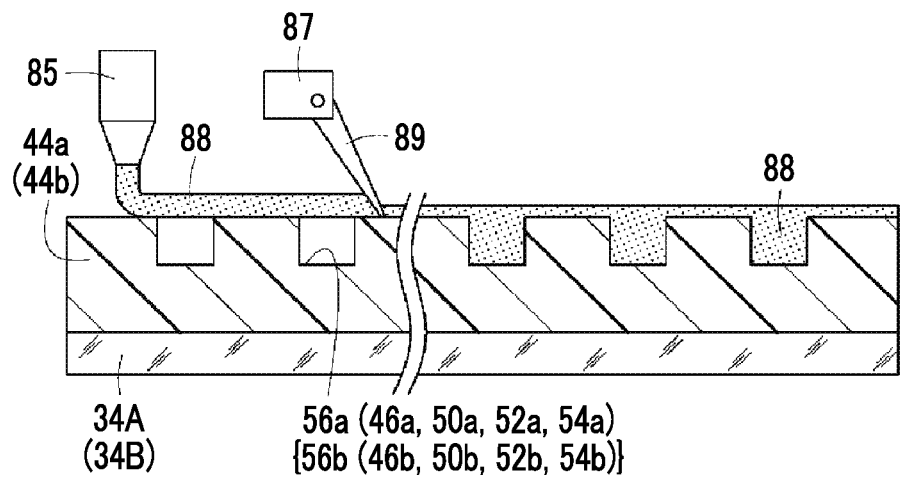
FIG. 7A is a first cross-sectional view illustrating a filling step and FIG. 7B is a second cross-sectional view illustrating the filling step.

Then, the first concave grooves 56a formed in the first resin layer 44a are filled with conductive ink (ink-like conductive material) 88 as the first conductive material 48a (Step S2: a filling step). That is, as illustrated in FIG. 7A, the conductive ink 88 is applied onto the outer surface of the first resin layer 44a by an ink supply unit 85 while the first substrate 34A is transported by roll-to-roll processing and a sweeping unit 87 comes into contact with the outer surface of the first resin layer 44a to introduce (fill) the conductive ink 88 on the outer surface of the first resin layer 44a into the first electrode groove 46a, the first wire connection groove 50a, the first wiring groove 52a, and the first terminal groove 54a.

The amount of conductive ink 88 supplied and the supply speed of the conductive ink 88 are set according to, for example, the viscosity of the conductive ink 88, the width and depth of the first electrode groove 46a, the first wire connection groove 50a, the first wiring groove 52a, and the first terminal groove 54a, and the transport speed of the first substrate 34A. The sweeping unit 87 includes a blade 89 which has a width that is equal to or greater than the width of the first resin layer 44a and extends so as to be inclined in a direction opposite to the transport direction of the first substrate 34A. That is, the contact angle (the angle formed between the first resin layer 44a and the blade 89) of the blade 89 with the first resin layer 44a is an acute angle. Therefore, the blade 89 can be pressed against the first resin layer 44a with appropriate pressure. As a result, it is possible to effectively introduce the conductive ink 88 on the outer surface of the first resin layer 44a into the first electrode groove 46a, the first wire connection groove 50a, and the first wiring groove 52a.

In this step, the contact angle and pressure of the blade 89 are set such that the conductive ink 88 can be effectively introduced into (fill) the first concave groove 56a. Therefore, as illustrated in FIG. 7A, the conductive ink 88 remains on the first resin layer 44a, in addition to in the first groove 56a. A preferred example of the conductive ink 88 is metal nano-ink. The metal nano-ink is ink obtained by dispersing metal nano-particles in water or a solvent and is characterized in that it can be sintered at a low temperature. Among the metal nano-inks, in particular, silver nano-ink is preferable in terms of a resistance value and temporal stability. Here, a filling method using roll-to-roll processing has been described. However, the filling method may be a sheet-to-sheet type.

Figure 7B:
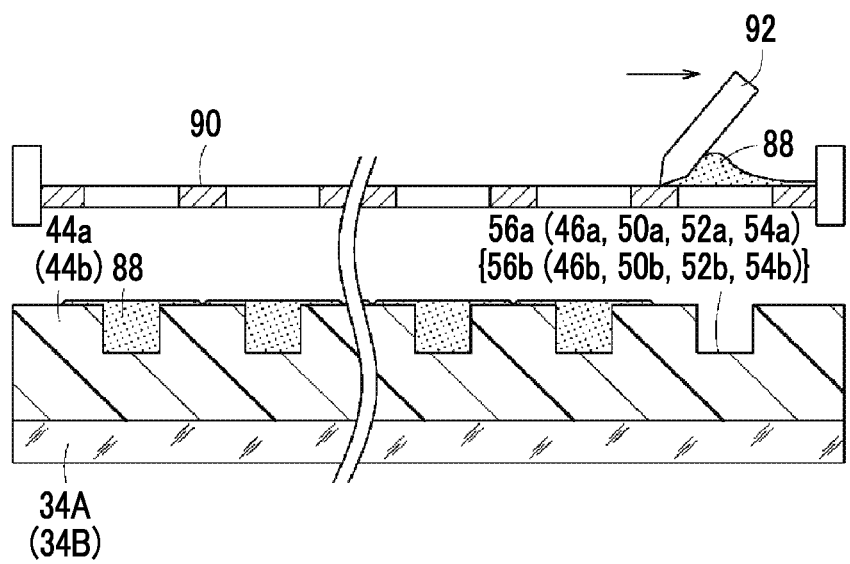

In the filling step, as illustrated in FIG. 7B, the first groove 56a may be filled with the conductive ink 88 by screen printing. Specifically, the conductive ink 88 applied onto a screen 90 is pressed by a squeegee 92 to fill the first terminal groove 54a in the first resin layer 44a. A method for filling the first terminal groove 54a with the conductive ink 88 is not limited to the screen printing, and ink jetting may be used. The use of the screen printing or the ink jetting makes it possible to effectively adjust the amount of conductive ink 88 applied to (filling) the first groove 56a. Even in a case in which the screen printing or the ink jetting is used, the conductive ink 88 remains on the first resin layer 44a, in addition to in the first groove 56a, as illustrated in FIG. 7B.

In the filling step, the first groove 56a may be filled with different types of conductive ink 88 to form a first conductive material 48a in which a plurality of types of materials are stacked. The conductive ink 88 is ink or paste including a material forming the first conductive material 48a.

Figure 8A:
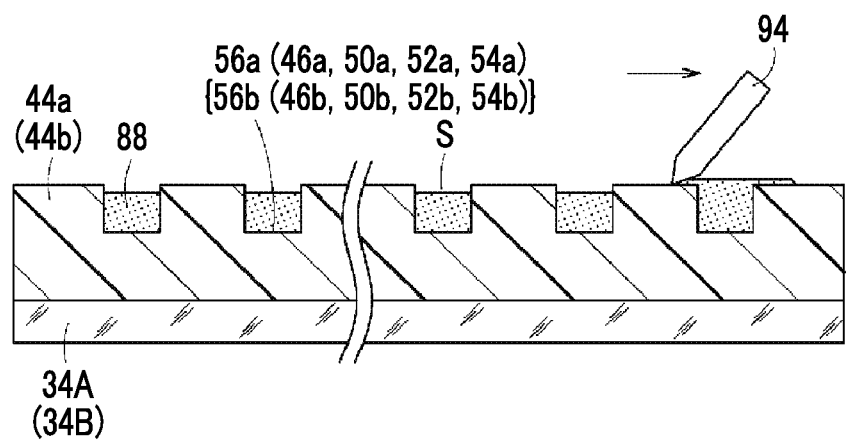
FIG. 8A is a cross-sectional view illustrating a removal step and FIG. 8B is a cross-sectional view illustrating a first heating step.

Then, as illustrated in FIG. 8A, the conductive ink 88 remaining on the outer surface of the first resin layer 44a is removed by a blade 94 (Step S3: a removal step). Specifically, the blade 94 is slid while coming into contact with the outer surface of the first resin layer 44a. The blade 94 may include a cleaning liquid that softens the remaining conductive ink 88. An example of the cleaning liquid is a mixture of isopropyl alcohol and acetone. In this case, when the mixture ratio of isopropyl alcohol to acetone is 9:1 or 8:2, it is possible to effectively soften the conductive ink 88.

In this case, a portion of the conductive ink 88 filling the first groove 56a is removed by the blade 94. That is, the first groove 56a of the first resin layer 44a is not completely filled with the conductive ink 88. In other words, the surface of the first conductive material 48a filling the first groove 56a is closer to the bottom of the groove than the outer surface of the first resin layer 44a and a space S is formed on the opening side of the first groove 56a.

In the removal step, one or a plurality of rollers may be pressed against the outer surface of the first resin layer 44a while the first substrate 34A is being transported by roll-to-roll processing, thereby removing the conductive ink 88 remaining on the outer surface of the first resin layer 44a. In this case, the roller may include the above-mentioned cleaning liquid.

Figure 8B:
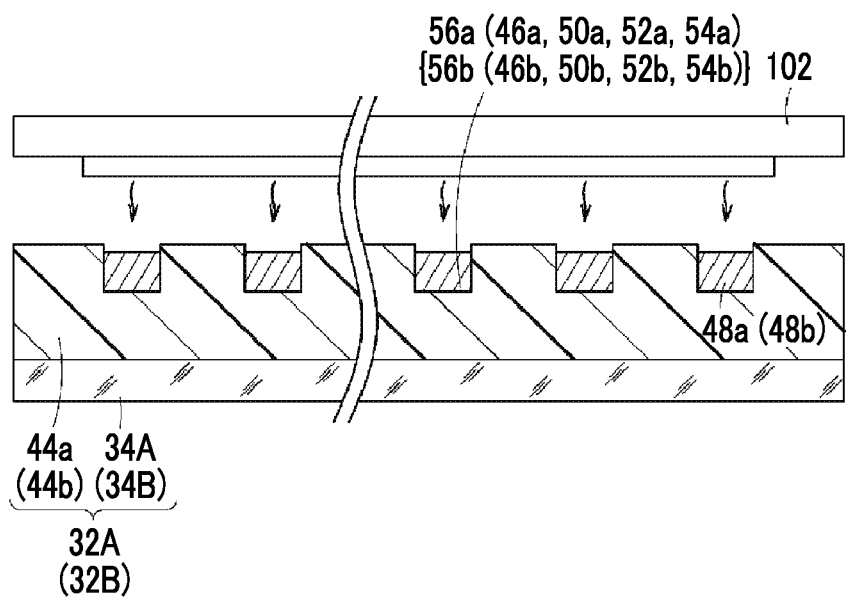

After the removal step, as illustrated in FIG. 8B, the conductive ink 88 filling the first groove 56a is heated and sintered (hardened) by a heating device 102 (Step S4: a first heating step). Specifically, the heating device 102 irradiates the conductive ink 88 with heat, hot wind, infrared rays, or far infrared rays. Heating conditions are set according to, for example, the material forming the conductive ink 88.

Then, the first connection portion 58A is patterned so as to come into contact with the conductive ink 88 filling the first terminal groove 54a and to cover a portion of the outer surface of the first resin layer 44a (Step S5: a connection portion forming step).

Figure 9A:
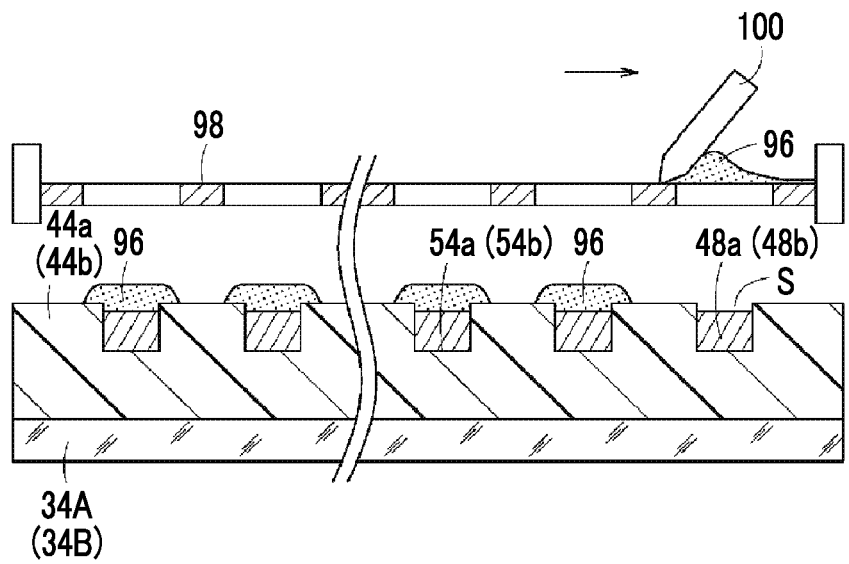
FIG. 9A is a cross-sectional view illustrating a connection portion forming step and FIG. 9B is a cross-sectional view illustrating a second heating step.

Specifically, an ink-like conductive member 96 is applied as the first connection portion 58A into the space S, which is formed on the opening side of the first terminal groove 54a, by screen printing (see FIG. 9A). That is, the conductive member 96 applied onto a screen 98 is extruded to the first resin layer 44a by a squeegee 100 to pattern the conductive member 96 in a region that is slightly larger than the first terminal groove 54a. In this case, the conductive members 96 are provided in a plurality of first terminal portions 42A so as to be separated from each other. The conductive member 96 is ink or paste including a material forming the first connection portion 58A. A method for applying the ink-like conductive member 96 is not limited to the screen printing and ink jetting may be used. The use of the screen printing and the ink jetting makes it possible to easily pattern the conductive member 96.

Figure 9B:
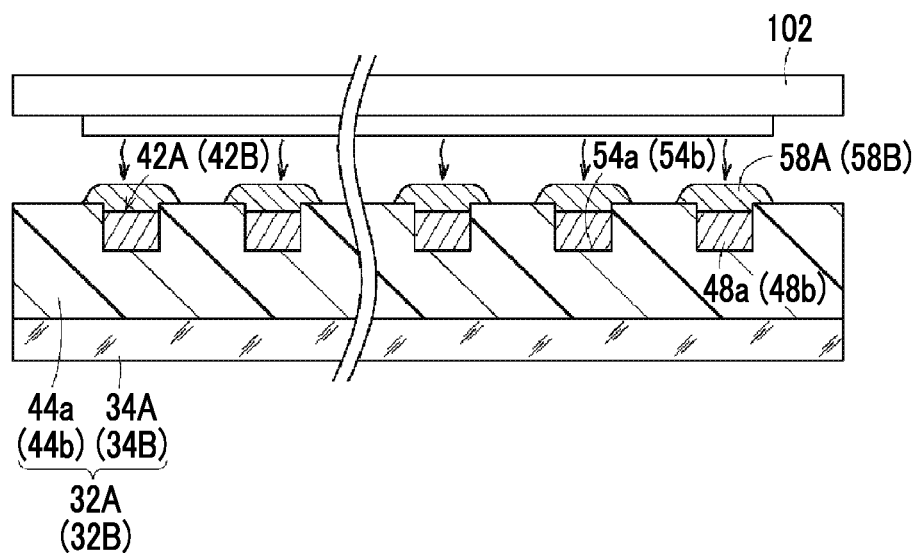

Then, as illustrated in FIG. 9B, the conductive member 96 provided in the first terminal portion 42A is heated and sintered (hardened) by the heating device 102 (Step S6: a second heating step). Specifically, the heating device 102 irradiates the conductive member 96 with heat, hot wind, infrared rays, or far infrared rays. Heating conditions are set according to, for example, a material forming the conductive member 96. In the second heating step, the heating temperature is preferably higher than the heating temperature in the first heating step. Since the heating temperature in the second heating step is high, it is possible to increase the adhesion between the conductive ink 88 and the conductive member 96. Instead of the first heating step and the second heating step, a common heating step may be used, according to the materials forming the conductive ink 88 and the conductive member 96. That is, Step S4 (first heating step) may be omitted and the conductive ink 88 filling the first groove 56a and the conductive member 96 provided in the first terminal portion 42A may be sintered (hardened) at the same time in Step S6 (second heating step).

In this way, the first detection electrode 36A, the first wire connection portion 38A, the first peripheral wire 40A, the first terminal portion 42A, and the first connection portion 58A are obtained. In this state, the first connection portion 58A covers a portion of the outer surface of the first resin layer 44a in a state in which it comes into contact with the first conductive material 48a filling the first terminal groove 54a.

Then, the anisotropic conductive film 60 and the flexible printed circuit board 28 are disposed so as to be laid across a plurality of first connection portions 58A and pressing and heating are performed such that the plurality of first connection portions 58A are electrically connected to the corresponding terminals 62 of the flexible printed circuit board 28 (Step S7: a pressing step). In this way, the touch panel 10 according to this embodiment is manufactured.

In the method for manufacturing the touch panel 10, the electrode portion forming step of forming the first detection electrode 36A, the first wire connection portion 38A, and the first peripheral wire 40A and the terminal portion forming step of forming the first terminal portion 42A are performed by the groove forming step, the filling step, and the removal step. That is, the electrode portion forming step and the terminal portion forming step are the same step and are performed at the same time.

However, the electrode portion forming step and the terminal portion forming step may be different steps. That is, after the first detection electrode 36A, the first wire connection portion 38A, and the first peripheral wire 40A are manufactured by the groove forming step, the filling step, and the removal step, the first terminal portion 42A may be manufactured by the groove forming step, the filling step, and the removal step.

According to this embodiment, the conductive first connection portions 58A, each of which comes into contact with the first conductive material 48a of the first terminal portion 42A and covers a portion of the outer surface of the first resin layer 44a, are provided in the plurality of first terminal portions 42A so as to be separated from each other. Therefore, it is possible to electrically connect the first conductive material 48a and the anisotropic conductive film 60 through the first connection portion 58A. In this way, even in a case in which the first concave terminal groove 54a formed in the first resin layer 44a is not completely filled with the first conductive material 48a, it is possible to reliably electrically connect the first conductive material 48a of the first terminal portion 42A and the terminal 62 of the flexible printed circuit board 28 through the first connection portion 58A and the anisotropic conductive film 60.

Since the first groove 56a is formed in the groove forming step and is filled with the conductive ink 88 as the first conductive material 48a in the filling step, it is possible to effectively form the first detection electrode 36A, the first wire connection portion 38A, the first peripheral wire 40A, and the first terminal portion 42A.

The average value of the height of the first connection portion 58A from the outer surface of the first resin layer 44a is preferably in the range of 0.05 µm to 5.0 µm and more preferably in the range of 0.1 µm to 2.0 µm. In this case, it is possible to appropriately reduce the contact resistance between the first connection portion 58A and the anisotropic conductive film 60 and to reliably bond the anisotropic conductive film 60 to a portion of the outer surface of the first resin layer 44a which is not covered by the first connection portion 58A.

According to this embodiment, since the first connection portion 58A includes conductive oxide particles and a binder, it is possible to easily repair the anisotropic conductive film 60 with respect to the first connection portion 58A.

In addition, the ink-like conductive member 96 is patterned as the first connection portion 58A by screen printing or ink jetting in the connection portion forming step. Therefore, it is possible to easily and effectively obtain the first connection portion 58A.

The function and effect of the first conductive film 32A and the first connection portion 58A have been described above. The second conductive film 32B and the second connection portion 58B have the same function and effect as described above. Therefore, the description of the function and effect of the second conductive film 32B and the second connection portion 58B will not be repeated, which holds for the following description.

Figure 10:
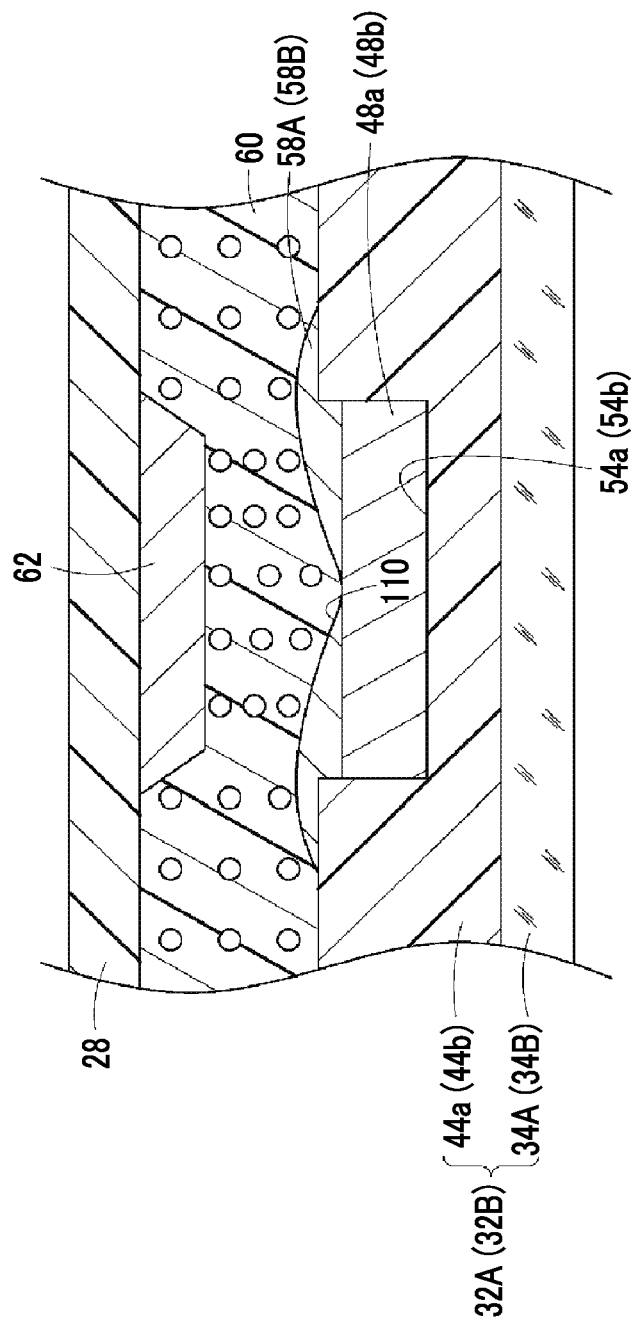
FIG. 10 is a cross-sectional view illustrating a recessed portion that is formed in a connection portion.

However, as the width of the first terminal groove 54a increases, the space S which is not filled with the first conductive material 48a in the first terminal groove 54a increases. Therefore, in the first connection portion 58A, the surface of a portion which covers the first conductive material 48a is likely to be closer to the bottom of the groove than a portion that covers the outer surface of the first resin layer 44a (see FIG. 10). When a recessed portion 110 is formed in the surface of the first connection portion 58A, the contact resistance between the first connection portion 58A and the anisotropic conductive film 60 is likely to increase. In contrast, as the width of the first terminal groove 54a decreases, the contact resistance between the first connection portion 58A and the first conductive material 48a filling the first terminal groove 54a increases.

Figure 11A:
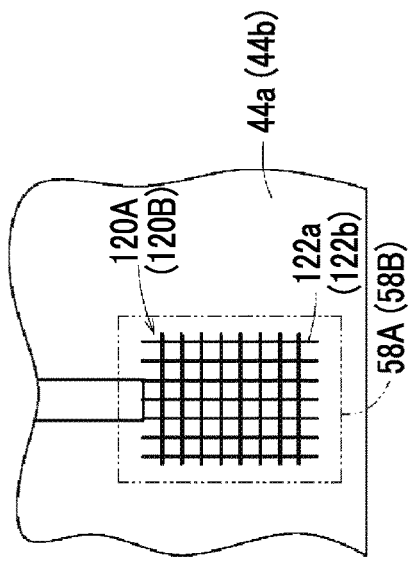
FIG. 11A is a plan view schematically illustrating a terminal portion according to a modification example and FIG. 11B is a cross-sectional view illustrating a state in which a flexible printed circuit board is connected to the terminal portion illustrated in FIG. 11A.
Figure 11B:
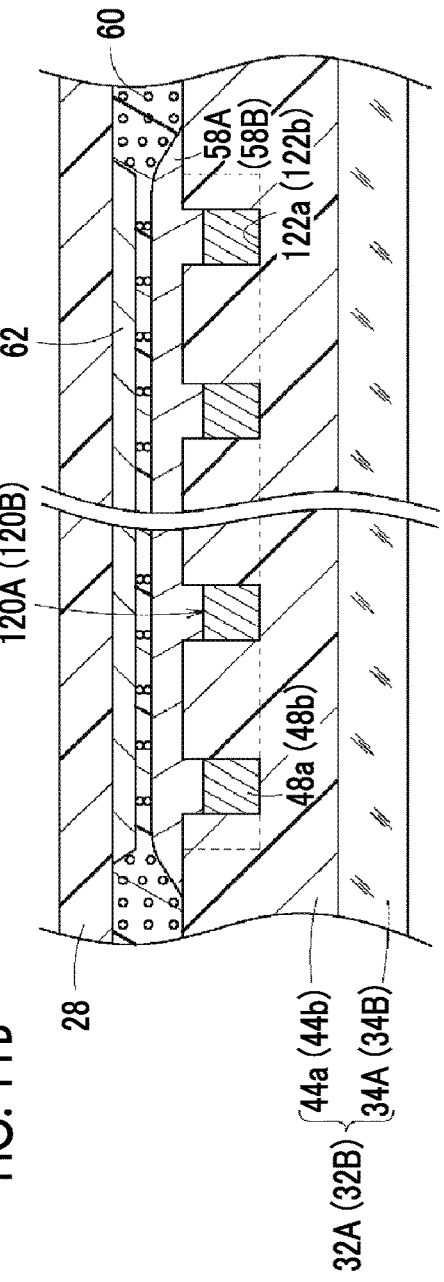

In the touch panel 10 according to this embodiment, the first conductive film 32A may include a first terminal portion 120A according to a modification example illustrated in FIGS. 11A and 11B. The first terminal portion 120A has a mesh pattern obtained by arranging a plurality of first concave terminal grooves 122a in a mesh shape. In other words, the mesh pattern is a combination of a plurality of cells with the same square shape.

The width of the first terminal groove 122a is preferably in the range of 2 μm to 30 μm and more preferably in the range of 3 μm to 15 μm. The pitch between the first terminal grooves 122a which are parallel and adjacent to each other is preferably in the range of 15 μm to 100 μm and more preferably in the range of 20 μm to 50 μm. The shape of the cell of the mesh pattern may be a polygon, such as a triangle, a rectangle, a pentagon, or a hexagon. Among them, it is preferable that the shape of the cell is a rhomboid, a square, and a regular hexagon. The mesh pattern may be a combination of a plurality of cells with different shapes.

The second conductive film 32B may have a second terminal portion 120B. The second terminal portion 120B has a mesh pattern obtained by arranging a plurality of second concave terminal grooves 122b in a mesh shape. In other words, the mesh pattern is a combination of a plurality of cells with the same square shape. The second terminal groove 122b has the same structure as the first terminal groove 122a.

According to this structure, the first terminal portion 120A includes a plurality of first terminal grooves 122a and the first connection portion 58A extends so as to be laid across at least two or more first terminal grooves 122a. Therefore, it is possible to reduce both the contact resistance between the first conductive material 48a of the first terminal portion 120A and the first connection portion 58A and the contact resistance between the first connection portion 58A and the anisotropic conductive film 60.

In addition, since the plurality of first terminal grooves 122a are arranged in a mesh shape, it is possible to effectively increase the number of first terminal grooves 122a forming the first terminal portion 120A. Therefore, it is possible to further reduce the contact resistance between the first conductive material 48a of the first terminal portion 120A and the first connection portion 58A.

EXAMPLES

Hereinafter, the invention will be described in detail with reference to examples of the invention. In the following examples, for example, materials, dimensions, ratios, the content of processes, and procedures can be appropriately changed, without departing from the scope and spirit of the invention. Therefore, the scope of the invention is not limited by the following examples.

Example 1

Figure 12:
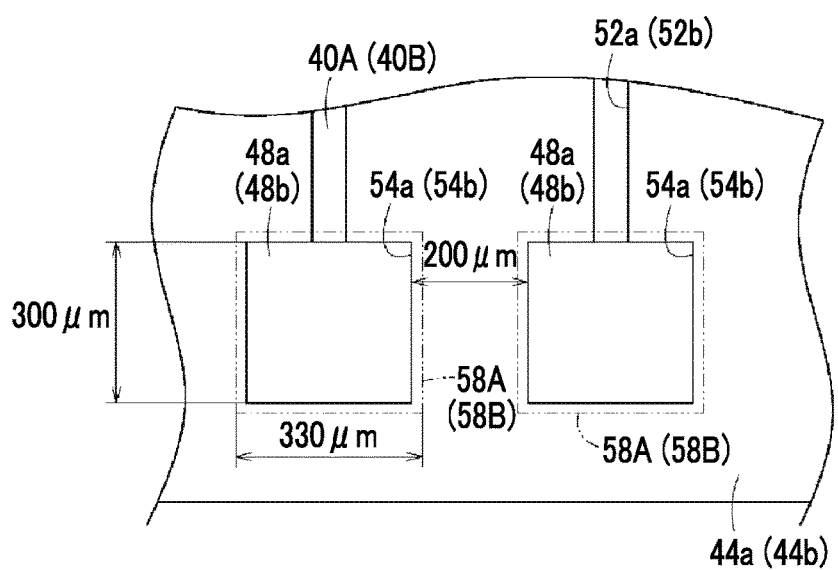
FIG. 12 is a plan view illustrating a terminal portion for describing Examples.

In a groove forming step, a first groove 56a (a first electrode groove 46a, a first wire connection groove 50a, a first wiring groove 52a, and a first terminal groove 54a) with a depth of 3 μm was formed in a first resin layer 44a which was made of an ultraviolet-curable acrylic resin and was provided on a first substrate 34A that had a thickness of 100 μm and was made of PET. In a filling step, the first groove 56a was filled with aqueous silver nano-ink as conductive ink 88. In a first heating step, the aqueous silver nano-ink was heated at 120° C. for 30 minutes and was dried to form a film. In this way, a first conductive film 32A including a first detection electrode 36A, a first wire connection portion 38A, a first peripheral wire 40A, and a first terminal portion 42A was obtained (see FIG. 2). As illustrated in FIG. 12, the first terminal portion 42A had a solid pattern including a first terminal groove 54a that had a square shape having one side with a length of 300 μm in a plan view. In addition, the gap between the first terminal grooves 54a which were adjacent to each other was 200 μm.

In a connection portion forming step, silver paste was patterned by screen printing to form each first terminal portion 42A such that the average value of the height of the first connection portion 58A from the outer surface of the first resin layer 44a was 1 μm. Each first connection portion 58A had a solid pattern with a square shape that has one side with a length of 330 μm. REXALPHA RA FA FS 015 manufactured by Toyo Ink Manufacturing Co., Ltd. was used as the silver paste and a stainless mesh screen (the number of meshes: 500; and a thickness: 25 μm) was used as the screen 98. In a second heating step, the silver paste was heated at 140° C. for 1 hour and was dried to form a film. In this way, a touch panel according to Example 1 was manufactured.

Example 2

A touch panel according to Example 2 was manufactured by the same method as the touch panel according to Example 1 except that, in a connection portion forming step, a stainless mesh screen (the number of meshes: 730; and a thickness: 15 μm) was used, a squeegee speed was reduced, and the average value of the height of a first connection portion 58A from the outer surface of a first resin layer 44a was 0.05 μm.

Example 3

A touch panel according to Example 3 was manufactured by the same method as the touch panel according to Example 1 except that, in a connection portion forming step, a stainless mesh screen (the number of meshes: 730; and a thickness: 15 μm) was used, a squeegee speed was reduced, and the average value of the height of a first connection portion 58A from the outer surface of a first resin layer 44a was 0.1 μm.

Example 4

A touch panel according to Example 4 was manufactured by the same method as the touch panel according to Example 1 except that, in a connection portion forming step, a squeegee speed was reduced and the average value of the height of a first connection portion 58A from the outer surface of a first resin layer 44a was 2 μm.

Example 5

A touch panel according to Example 5 was manufactured by the same method as the touch panel according to Example 1 except that, in a connection portion forming step, a stainless mesh screen (the number of meshes: 400; and a thickness: 30 μm) was used and the average value of the height of a first connection portion 58A from the outer surface of a first resin layer 44a was 5 μm.

Example 6

A touch panel according to Example 6 was manufactured by the same method as the touch panel according to Example 1 except that a first terminal portion 42A had a mesh pattern formed by arranging first terminal grooves 54a with a width of 10 μm at a pitch of 30 μm in a mesh shape.

Example 7

A touch panel according to Example 7 was manufactured by the same method as the touch panel according to Example 1 except that ITO ink was patterned into a first terminal portion 42A by an ink jet device in a connection portion forming step and was heated and sintered at 130° C. for 1 hour in a second heating step and the average value of the height of a first connection portion 58A from the outer surface of a first resin layer 44a was 1.5 μm. In addition, DMP2831 manufactured by DIMATIX, Inc. was used as the ink jet device and ink obtained by adjusting the viscosity of transparent conductive ITO ink X-100 manufactured by Sumitomo Metal Mining Co., Ltd. to 15 mPa·s was used as the ITO ink.

Comparative Example

A touch panel according to Comparative Example was manufactured by the same method as the touch panel according to Example 1 except that the first connection portion 58A was not formed.

[Evaluation]

Ten first connection portions 58A were pressed against the flexible printed circuit board 28 by the anisotropic conductive film 60 and the resistance values between the first conductive materials 48a of the ten first terminal portions 42A and the corresponding terminals 62 of the flexible printed circuit board 28 were measured. Then, the contact resistance between the first terminal portion 42A and the flexible printed circuit board 28 was evaluated.

Specifically, a case in which the measured resistance values of all of the first terminal portions 42A are less than 80% of a reference resistance value during electrical connection is represented by "AA", a case in which the measured resistance values of all of the first terminal portions 42A are equal to or greater than 80% of the reference resistance value and are less than 90% of the reference resistance value during electrical connection is represented by "A", a case in which the measured resistance values of all of the first terminal portions 42A are equal to or greater than 90% of the reference resistance value and are less than 100% of the reference resistance value during electrical connection is represented by "B", and a case in which at least one first terminal portion 42A is insulated is represented by "C". The low measured resistance value of the first terminal portion 42A means a low contact resistance between the first conductive material 48a and the first connection portion 58A and a low contact resistance between the first connection portion 58A and the anisotropic conductive film 60.

[Results]

The results of Examples 1 to 7 and Comparative Example are illustrated in Table 1. As illustrated in Table 1, electrical connection was confirmed in all of the first terminal portions 42A in Examples 1 to 7. In particular, the evaluation results of Examples 6 and 7 were AA, the evaluation results of Examples 1, 3, and 4 were A, and the evaluation results of Examples 2 and 5 were B.

In Table 1, the thickness of a connection portion corresponds to the "average value of the height of the first connection portion 58A from the outer surface of the first resin layer 44a" and was measured by a cross-section SEM in a state in which the flexible printed circuit board 28 was pressed.

TABLE 1

|  | Material forming connection portion | Thickness of connection portion (μm) | Pattern of terminal portion | Contact resistance |
| --- | --- | --- | --- | --- |
| Comparative Example | Nothing | 0 | Solid pattern | C |
| Example 1 | Ag paste | 1.0 | Solid pattern | A |
| Example 2 | Ag paste | 0.05 | Solid pattern | B |
| Example 3 | Ag paste | 0.1 | Solid pattern | A |
| Example 4 | Ag paste | 2 | Solid pattern | A |
| Example 5 | Ag paste | 5 | Solid pattern | B |
| Example 6 | Ag paste | 1.0 | Mesh pattern | AA |
| Example 7 | ITO ink | 1.5 | Mesh pattern | AA |

As can be seen from Table 1, it is preferable that the first terminal portion 42A has a mesh pattern as in Examples 6 and 7. In addition, it is preferable that the average value (the thickness of the connection portion) of the height of the first connection portion 58A from the outer surface of the first resin layer 44a is in the range of 0.1 μm to 2 μm as in Examples 1 to 5.

The touch panel 10 and the method for manufacturing the touch panel 10 according to this embodiment are not limited to the above-mentioned structure and method. In the first conductive film 32A, the first detection electrode 36A, the first wire connection portion 38A, and the first peripheral wire 40A may be formed by, for example, a method that vapor-deposits metal on the first substrate 34A, forms a patterned resist on the metal, and etches the metal with an etchant to form a fine metal line pattern or a method that applies metal ink onto the first substrate 34A using screen printing to form a fine metal line pattern. This holds for the second conductive film 32B.

In the first conductive film 32A, a first dummy pattern may be provided between the first detection electrodes 36A which are adjacent to each other in order to make it difficult to see the first detection electrode 36A. The first detection electrode 36A is insulated from the first dummy pattern. The first dummy pattern and the first detection electrode 36A can be formed at the same time by the groove forming step, the filling step, and the removal step. Similarly to the above, the first dummy pattern may be formed by, for example, the method that vapor-deposits metal on the first substrate 34A, forms a patterned resist on the metal, and etches the metal with an etchant to form a fine metal line pattern or the method that applies metal ink onto the first substrate 34A using screen printing to form a fine metal line pattern. It is preferable that the width and pitch of the first dummy pattern are the same as those of the first detection electrode 36A. This holds for the second conductive film 32B.

The touch panel and the method for manufacturing the touch pan according to the invention are not limited to the above-described embodiment and may have various structures, without departing from the scope and spirit of the invention.

EXPLANATION OF REFERENCES

10: touch panel
12: display device
26: sensor body
28: flexible printed circuit board
32A: first conductive film
32B: second conductive film
34A: first substrate
34B: second substrate
36A: first detection electrode
36B: second detection electrode
38A: first wire connection portion
38B: second wire connection portion
40A: first peripheral wire
40B: second peripheral wire
42A, 120A: first terminal portion
42B, 120B: second terminal portion
44a: first resin layer
44b: second resin layer
46a: first electrode groove
46b: second electrode groove
48a: first conductive material
48b: second conductive material
50a: first wire connection groove
50b: second wire connection groove
52a: first wiring groove
52b: second wiring groove
54a, 122a: first terminal groove
54b, 122b: second terminal groove
56a: first groove
56b: second groove
58A: first connection portion
58B: second connection portion
60: anisotropic conductive film
110: recessed portion

What is claimed is:

1. A touch panel comprising:
a substrate;
a plurality of detection electrodes that are provided on the substrate;
terminal portions that are provided so as to correspond to the detection electrodes; and
peripheral wires that electrically connect the detection electrodes and the terminal portions corresponding to the detection electrodes,
wherein the terminal portion includes a resin layer that has a groove and is provided on the substrate and a conductive material that fills the groove, wherein the groove is not completely filled with the conductive material,
a plurality of terminal portions, each terminal portion having a plural conductive connection portion, wherein each conductive connection portion is independent from each other, and
each conductive connection portion comes into contact with the conductive material of the terminal portion in a state in which each conductive connection portion enters an opening side of the groove and each conductive connection portion covers a portion of an outer surface of the resin layer.

2. The touch panel according to claim 1,
wherein each terminal portion includes a plurality of grooves, and
each connection portion extends across at least two or more grooves.

3. The touch panel according to claim 2,
wherein, in each terminal portion, the plurality of grooves are arranged in a mesh shape.

4. The touch panel according to claim 1,
wherein the detection electrode and the peripheral wire each include the resin layer having the groove and the conductive material filling the groove.

5. The touch panel according to claim 2,
wherein the detection electrode and the peripheral wire each include the resin layer having the groove and the conductive material filling the groove.

6. The touch panel according to claim 3,
wherein the detection electrode and the peripheral wire each include the resin layer having the groove and the conductive material filling the groove.

7. The touch panel according to claim 1,
wherein an average value of a height of each connection portion from the outer surface of the resin layer is in a range of 0.1 μm to 2.0 μm.

8. The touch panel according to claim 2,
wherein an average value of a height of each connection portion from the outer surface of the resin layer is in a range of 0.1 μm to 2.0 μm.

9. The touch panel according to claim 3,
wherein an average value of a height of each connection portion from the outer surface of the resin layer is in a range of 0.1 μm to 2.0 μm.

10. The touch panel according to claim 4,
wherein an average value of a height of each connection portion from the outer surface of the resin layer is in a range of 0.1 μm to 2.0 μm.

11. The touch panel according to claim 5,
wherein an average value of a height of each connection portion from the outer surface of the resin layer is in a range of 0.1 μm to 2.0 μm.

12. The touch panel according to claim 6,
wherein an average value of a height of each connection portion from the outer surface of the resin layer is in a range of 0.1 μm to 2.0 μm.

13. The touch panel according to claim 1,
wherein each connection portion includes conductive oxide particles and a binder.

14. The touch panel according to claim 1,
wherein each connection portion is electrically connected to a flexible printed circuit board through an anisotropic conductive film.

15. The touch panel according to claim 1,
wherein the conductive connection portion is formed of a different material than the conductive material filling the groove.

16. A method for manufacturing a touch panel comprising a substrate, a plurality of detection electrodes that are provided on the substrate, terminal portions that are provided so as to correspond to the detection electrodes, peripheral wires that electrically connect the detection electrodes and the terminal portions corresponding to the detection electrodes, and connection portions that are provided in a plurality of terminal portions so to be independent from each other, the method comprising:
an electrode portion forming step of forming the detection electrode and the peripheral wire;
a terminal portion forming step of forming the terminal portion; and
a connection portion forming step of forming the connection portion, wherein the terminal portion forming step includes:
a groove forming step of forming a resin layer on at least a portion of one surface of the substrate and pressing a mold having a projection against the resin layer to form a groove;
a filling step of filling at least a portion of the groove with an ink-like conductive material; and
a removal step of removing the ink-like conductive material remaining on the outer surface of the resin layer, and
in the connection portion forming step, a conductive member is patterned as the connection portion so as to come into contact with the conductive material of the terminal portion, to enter a space formed on an opening side of the groove and to cover a portion of the outer surface of the resin layer.

17. The method for manufacturing a touch panel according to claim 16,
wherein, in the connection portion forming step, an ink-like conductive member is patterned as the connection portion by screen printing or ink jetting.

18. The method for manufacturing a touch panel according to claim 16,
wherein, in the groove forming step, the mold is pressed against the resin layer to form a plurality of grooves in the terminal portion, and
in the connection portion forming step, the connection portion is formed so as to extend across at least two or more grooves.

19. The method for manufacturing a touch panel according to claim 18,
wherein, in the groove forming step, the mold is pressed against the resin layer to form a plurality of grooves in the terminal portion in a mesh shape.

20. The method for manufacturing a touch panel according to claim 16,
wherein the electrode portion forming step and the terminal portion forming step are the same step and are performed at the same time.

21. The method for manufacturing a touch panel according to claim 16, further comprising:
a pressing step of pressing a flexible printed circuit board and the connection portion, using an anisotropic conductive film, so as to be electrically connected to each other after the connection portion forming step.

22. The method for manufacturing a touch panel according to claim 16,
wherein the conductive connection portion is formed of a different material than the conductive material filling the groove.

* * * * *